US006173732B1

United States Patent
Davis et al.

(10) Patent No.: US 6,173,732 B1
(45) Date of Patent: Jan. 16, 2001

(54) FERTILIZER SYSTEM

(76) Inventors: Richard N. Davis; Dorthy A. Davis, both of 2462 W. Shore Dr., Biloxi, MS (US) 29532-3022

(*) Notice: Under 35 U.S.C. 154(b), the term of this patent shall be extended for 0 days.

(21) Appl. No.: 09/510,509

(22) Filed: Feb. 22, 2000

Related U.S. Application Data

(60) Provisional application No. 60/158,361, filed on Oct. 12, 1999.

(51) Int. Cl.[7] ..................................... E03B 11/00
(52) U.S. Cl. .......................... 137/377; 137/268; 422/264; 239/310
(58) Field of Search .................... 137/268, 377; 239/310, 317; 422/261, 264, 255

(56) References Cited

U.S. PATENT DOCUMENTS

| | | |
|---|---|---|
| 1,763,374 | 6/1930 | Schrader . |
| 2,758,878 | * 8/1956 | Dominick, Sr. ................. 137/268 X |
| 3,864,090 | * 2/1975 | Richards ........................ 137/268 X |
| 5,303,729 | 4/1994 | DeMarco . |
| 5,335,690 | 8/1994 | Worth . |
| 5,364,030 | 11/1994 | Murdock et al. . |
| 5,441,073 | 8/1995 | Hoadley . |
| 5,447,641 | 9/1995 | Wittig . |
| 5,666,987 | 9/1997 | Combs . |
| 5,699,827 | 12/1997 | Delorme et al. . |
| 5,730,364 | 3/1998 | Gertie . |
| 5,775,593 | 7/1998 | Delorme et al. . |
| 5,839,665 | 11/1998 | DiVittorio . |

FOREIGN PATENT DOCUMENTS 5-15221   1/1993  (JP) .

* cited by examiner

Primary Examiner—Kevin Lee
(74) Attorney, Agent, or Firm—Richard C. Litman

(57) ABSTRACT

A chemical feeding system for adding either liquid or 100% water soluble solid chemicals including fertilizer, insecticide and a herbicide to a lawn sprinkler system either above or below ground level. The system has one or two vertically oriented mixing chambers containing a removable sponge filter. An effluent tube is attached to the bottom of the mixing chamber for recycling through an adjustable flow meter valve. A drain tube with a shutoff valve and a one-way check valve leads to the main sprinkler system.

5 Claims, 5 Drawing Sheets

FERTILIZER SYSTEM

CROSS-REFERENCE TO RELATED APPLICATION

This application claims the benefit of U.S. Provisional Patent Application Serial No. 60/158,361, filed Oct. 12, 1999.

BACKGROUND OF THE INVENTION

1. Field of the Invention

The present invention relates generally to a fertilizer system. More specifically, 100% water soluble granular (up to 3 inch pellets) or liquid fertilizer can be added by a mixing and feeding device connected above or below ground to an existing water sprinkling system.

2. Description of Related Art

There is a need for a simplified but effective chemical feeding system for adding fertilizer chemicals for an existing or to be installed lawn sprinkler system. An above ground installation can have its mixing chamber doubled in volume and made automatic in operation. Optionally, the fertilizer feeding system can be constructed so it can be added as an underground covered installation for those who do not wish the visual exposure in the lawn. The instant invention provides such a chemical feeding system with a recycling feature of the mixture back to the mixing chamber.

The related art of interest describes various chemical feeding systems to an aqueous distribution system, but none discloses the present invention. The related art of interest will be discussed according to the perceived relevance to the present invention.

U.S. Pat. No. 5,666,987 issued on Sep. 16, 1997, to Glenn A. Combs describes a chemical dispersing apparatus employing a vertical cylindrical vessel having a capacity up to 1,000 gallons of water which mixes the fertilizer solid or liquid contained in the vessel outside one or two vertical cylindrical screens. The dissolved fertilizer passes upward and to an outlet product valve 18 (for excessive gas) to the product mixture outlet valve 24 and distribution. A bypass line 23 and bypass valve 22 can feed pure water to dilute the mixed fluid. The mixing water enters the vessel from the bottom through a Globe valve 4, an intake valve 5 and a check valve 5A. A drain valve 15 is positioned on a drain nozzle at the bottom of the mixing vessel. The apparatus is distinguishable for lacking a recycling system employing a flowmeter valve.

U.S. Pat. No. 5,447,641 issued on Sep. 5, 1995, to John D. Wittig describes a plastic poultry water chlorinator with calcium hypochlorite positioned above ground and comprising a chlorinator housing or mixing chamber with a removable cover positioned in parallel with the main water line. Shutoff valves are positioned in each line, i.e., main line, inlet line and outlet line, a pressure gauge in the inlet line, and a vent valve in the outlet line. The housing has a manual flow control knob proximate its base. The chlorinator device is distinguishable for its housing lacking a recycle line and a drain tube and the requirements for a pressure valve and a chlorine vent valve.

U.S. Pat. No. 5,364,030 issued on Nov. 15, 1994, to James L. Murdock describes a solution injector apparatus positioned permanently above ground for underground sprinkler systems. A sealed tank containing liquid fertilizer or pesticide has an intake pipe from the sprinkler pipe controlled by only one intake valve. The outlet pipe begins with a vertical tube (inside the tank with screened pin holes) which returns to the sprinkler pipe. A bypass valve between the two tees controls passage of water through the tank. The solution injector apparatus is distinguishable for lacking volumetric or quantitative control of the additive to the sprinkler system.

U.S. Pat. No. 5,730,364 issued on Mar. 24, 1998, to Robert M. Gertie describes an automatic fertilizing device comprising an inverted T-shaped chamber with a threaded cap on a vertical rod with a disc which presses down on a solid chemical tablet at the bottom. The tablet is trapped between two screens in the bottom horizontal portion of the inverted T-shaped cylinder which is connected to an underground sprinkler line. The device is distinguishable for its lack of any volumetric or quantitative control of the dissolution of the solid fertilizer fed to the sprinkler system.

U.S. Pat. No. 5,303,729 issued on Apr. 19, 1994, to Peter DeMarco describes a lawn chemical delivery system which can be utilized for sprinkler systems distributing fertilizer, herbicide, fungicide, and insecticide for gardens, and chlorine for pool systems. A cylindrical tank has a flow head separated by a control plate. The flow head has an intake port for feeding water into the chemicals stored in the container portion to be mixed and siphoned through siphon tubes and the exit port for distribution. The delivery system is distinguishable for its required siphoning system.

U.S. Pat. No. 5,335,690 issued on Aug. 9, 1994, to E. Wayne Worth describes a water and fertilizer dispensing apparatus comprising a portable cylindrical tank on legs positioned above ground for hook-up with a garden hose. A whirlpool effect is created by an inlet distributing pipe having an apertured vertical pipe and a curved and apertured horizontal pipe. A horizontal outlet pipe has a non-apertured vertical portion supporting an apertured horizontal portion. A manual diverter valve controls the water fed to the two main feeder pipes. The apparatus is distinguishable for its required internal apertured pipes.

U.S. Pat. No. 1,763,374 issued on Jun. 10, 1930, to Gustave C. C. Schrader describes an apparatus for distributing fertilizer in soluble condition. A vertical tank containing a saturated fertilizer solution is added in parallel by two pairs of Y-fittings to an apertured distributing pipe system having a stop cock in the main line. The inlet pipe has a stop cock and a drain cock for the Y-fitting. A nozzle feeds the water upwardly into the tank. The apparatus is distinguishable for its lack of volumetric or quantitative control of additive to the sprinkler system.

U.S. Pat. No. 5,441,073 issued on Aug. 15, 1995, to Francis B. Hoadley describes an apparatus for a controlled venturi release of an erodible solid into a liquid. A fertilizer or chlorine capsule is entrained in the vertical capped activation chamber by a capped and perforated hydro-injector body containing an apertured swirler plate. The hydro-injector body is L-shaped with an inlet opening and a small regulating exit hole leading to the outlet of the lower body member or hydro chamber which is inserted in a water distribution pipe. The apparatus is distinguishable for its reliance on a venturi system containing a swirler plate and an impaled venturi plate.

U.S. Pat. Nos. 5,699,827 and 5,775,593 issued, respectively, on Dec. 23, 1997, and Jul. 7, 1998, to Virgil A. Delorme et al. describe an automatic lawn treatment dispensing liquid fertilizer or pesticide device connectable either permanently to (1) an underground sprinkler system or (2) momentarily to a water faucet. An upright cylindrical transparent tube or container contains a center pipe which contains the liquid additive fed from a closable filling port on top. The center pipe is open on top and does not extend to the top of the mixing tube. In invention (1) a flexible aspirator tube or siphon extends from the main water source up into the center pipe and back down to the bottom of the transparent tube to force the additive solution into the bottom exit pipe. In invention (2) an aspirator tube is substituted with an anti-siphon valve assembly on top of the upright transparent tube or container and has a check valve. The bottom cap portion of the mixing tube has an apertured control plate. An external shutoff valve is provided in both patents. The devices are distinguishable for requiring an additional internal mixing chamber for the liquid additive and a siphoning feature.

U.S. Pat. No. 5,839,665 issued on Nov. 24, 1998, to Adrian G. DiVittorio describes a sprinkler system including buried cone-shaped fertilizer reservoir and a separated ground-level ball valve in each zone. The reservoir has a filling and sealing cap at ground level. The reservoir is directly inserted into the pipeline of each zone in the sprinkler system. The sprinkler system reservoir is distinguishable for its cone-shaped structure and lack of drainage control.

French Patent No. 2,545,685 issued on Nov. 16, 1984, to Rhone-Poulenc Agrochimie describes a liquid fertilizer being supplied to an agricultural irrigator line. A venturi tube is connected to a bypass line with inlet and outlet pipes of small diameters being inserted in the main water line on opposite sides of a shutoff valve. A separate tank containing the liquid additive feeds the venturi tube. The additive supplying system is distinguishable for its venturi feature for adding liquid fertilizer.

Japanese Patent No. 5-15221 issued on Jan. 6, 1993, to Yoshio Hosokawa describes an apparatus for mixing liquid fertilizer from a mixing apparatus receiving the additive from a separate supply tank. The mixing apparatus is inserted in a bypass pipe line attached across a ball valve in the main water supply line. A flowmeter is shown inserted in the main pipeline downstream. The apparatus is distinguishable for its separated mixing container and supply tank.

None of the above inventions and patents, taken either singly or in combination, is seen to describe the instant invention as claimed.

SUMMARY OF THE INVENTION

The invention is a fertilizer feeding system for adding a soluble solid or liquid fertilizer to an aqueous distribution system, which has one or two vertically oriented cylindrical, transparent and/or opaque mixing chambers containing a removable sponge filter between an upper removable cover and a bottom end piece. A tee connection is attached to the bottom end piece and has an effluent tube leading to an adjustable flow meter valve and entering the top cap to cause partial recycling of the liquid and dissolved solids if present. The mixing chamber can have one or two chambers having a flexible effluent drain tube with a shutoff valve and optionally a one-way check valve in its bottom cap which leads to a main sprinkler pipeline.

The single transparent or multiple mixing chamber is attached by a U-shaped valved pipe line to the main water pipeline which has a shutoff valve between the legs of the U-shaped pipe line. The inlet pipe portion contains a main shutoff valve. Alternatively, a solenoid controlled water valve can be inserted for or added upstream of the main shutoff valve to enable automatic sprinkling when the sprinkler system is operating. The outlet pipe portion contains a one-way valve. A fertilizer in liquid or granular form or a pesticide can be added to the mixing chamber for mixing and feeding the main water pipeline at a controlled rate by the flowmeter valve.

Accordingly, it is a principal object of the invention to provide an add-on chemical feeding system for mixing and feeding a chemical to an existing or installable underground water sprinkler system.

It is another object of the invention to provide an add-on chemical feeding unit device for mixing and/or dissolving a fertilizer, fungicide or pesticide for distribution to an underground water sprinkler system.

It is a further object of the invention to provide an add-on chemical feeding unit device for mixing a liquid or granular soluble fertilizer for distribution to an underground sprinkler system by automatic operation and a drainage feature.

Still another object of the invention is to provide an add-on chemical feeding unit to a garden's underground sprinkler system either above ground uncovered or underground with a partially visible cover.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
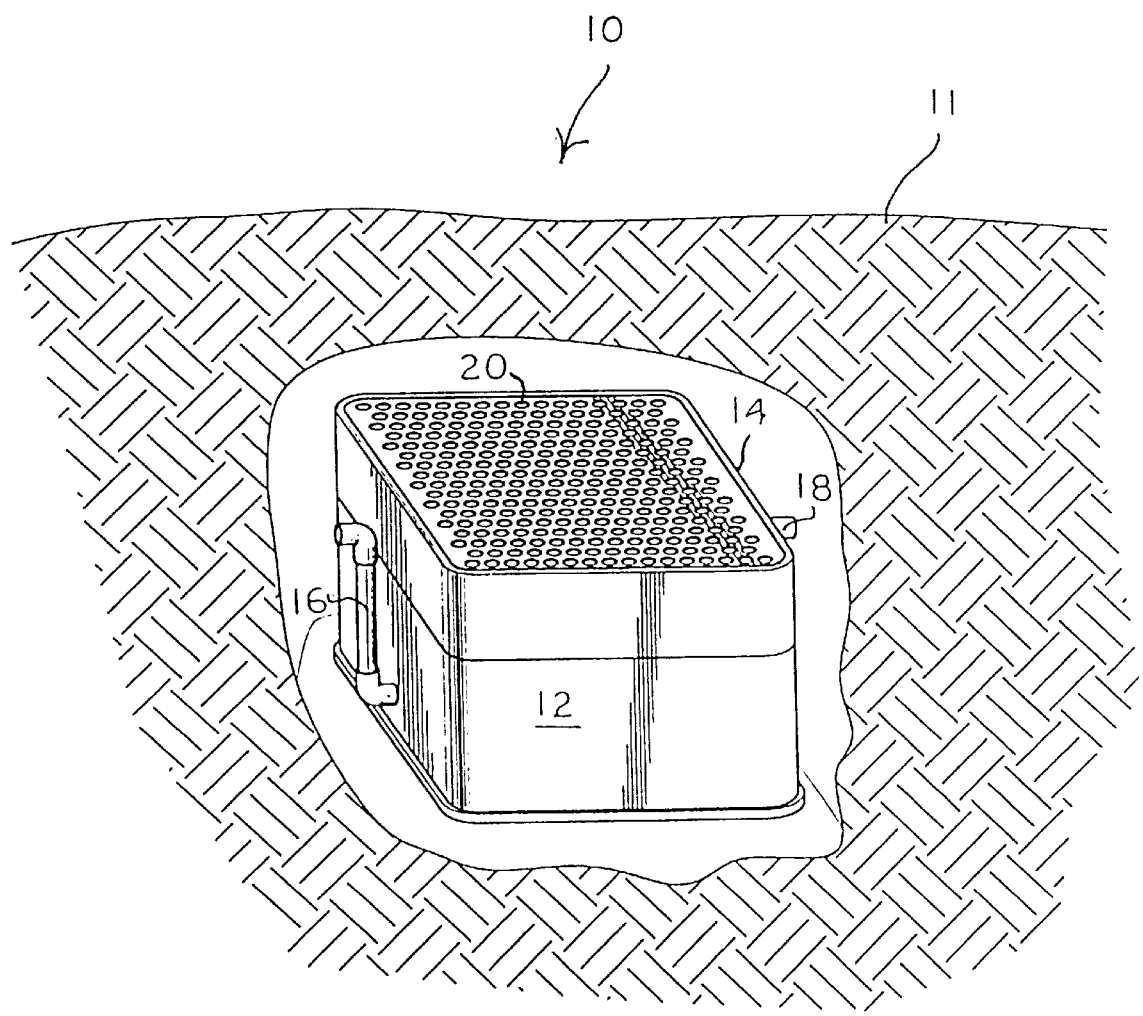
FIG. 1 is an environmental, perspective view of a first embodiment of a covered fertilizer system embedded in the soil of a garden according to the present invention.

The present invention is directed to a chemical feeding system for adding chemicals to an aqueous distribution system manually or automatically such as a fertilizer, fungicide or insecticide for an underground water sprinkler system In FIG. 1, a first embodiment of an underground system 10 is shown in the ground 11 with a housing 12 having a cover 14. The plumbing system inside will be explained subsequently in FIGS. 2 and 3. The left conduit 16 shown in FIG. 1 is an effluent pipe connected to the main water pipeline (not shown). The right conduit 18 is a partially shown influent pipe connected to the same main water pipeline upstream from conduit 16. The cover 14 is maintained above ground level and has apertures 20. It should be noted that conduits 16 and 18 for the underground system 10 are directed upwardly rather than downwardly in FIGS. 2 and 3.

Figure 2:
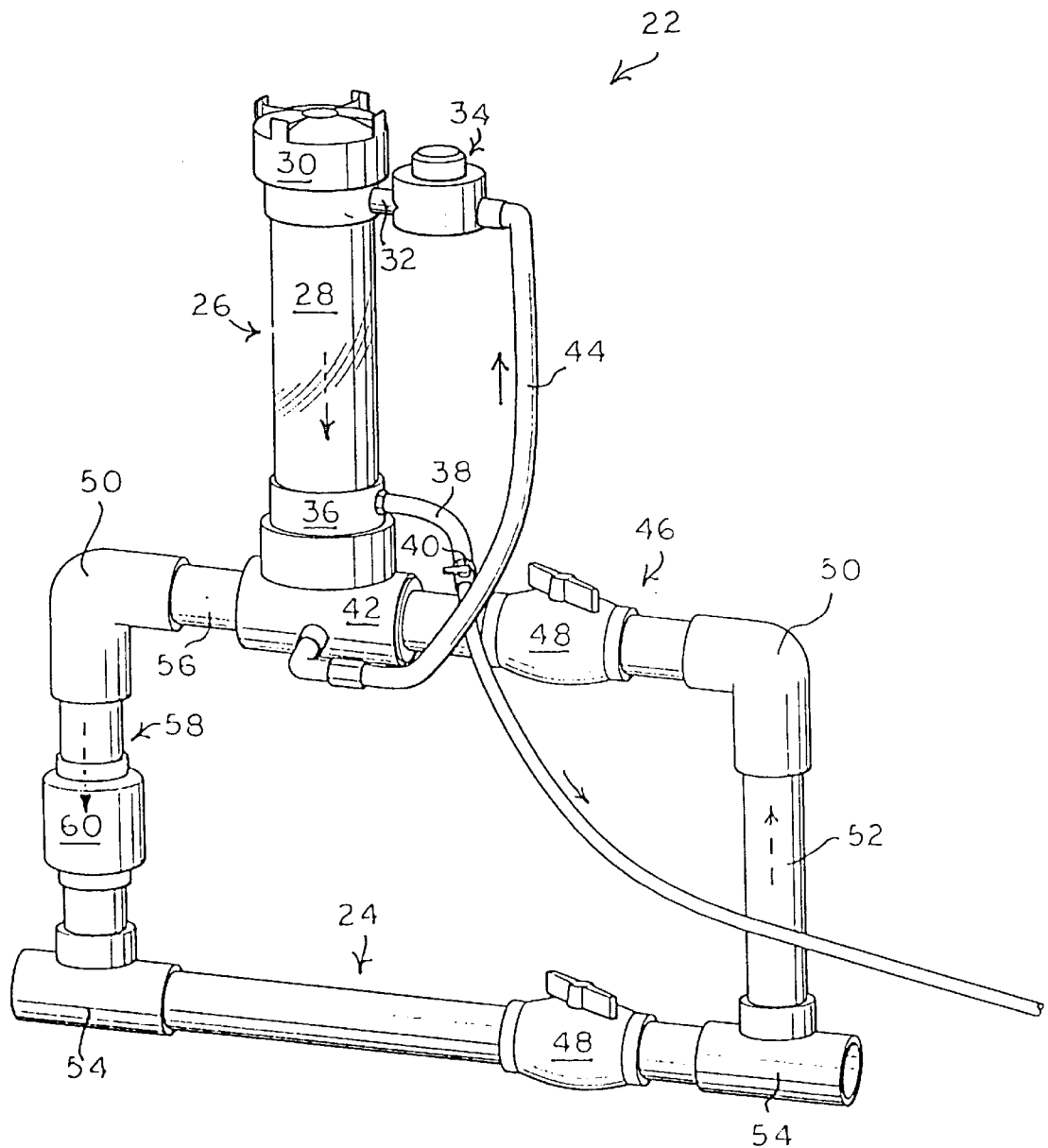
FIG. 2 is a perspective view of a fertilizer system showing a direct connection to a water pipe system.
Figure 3:
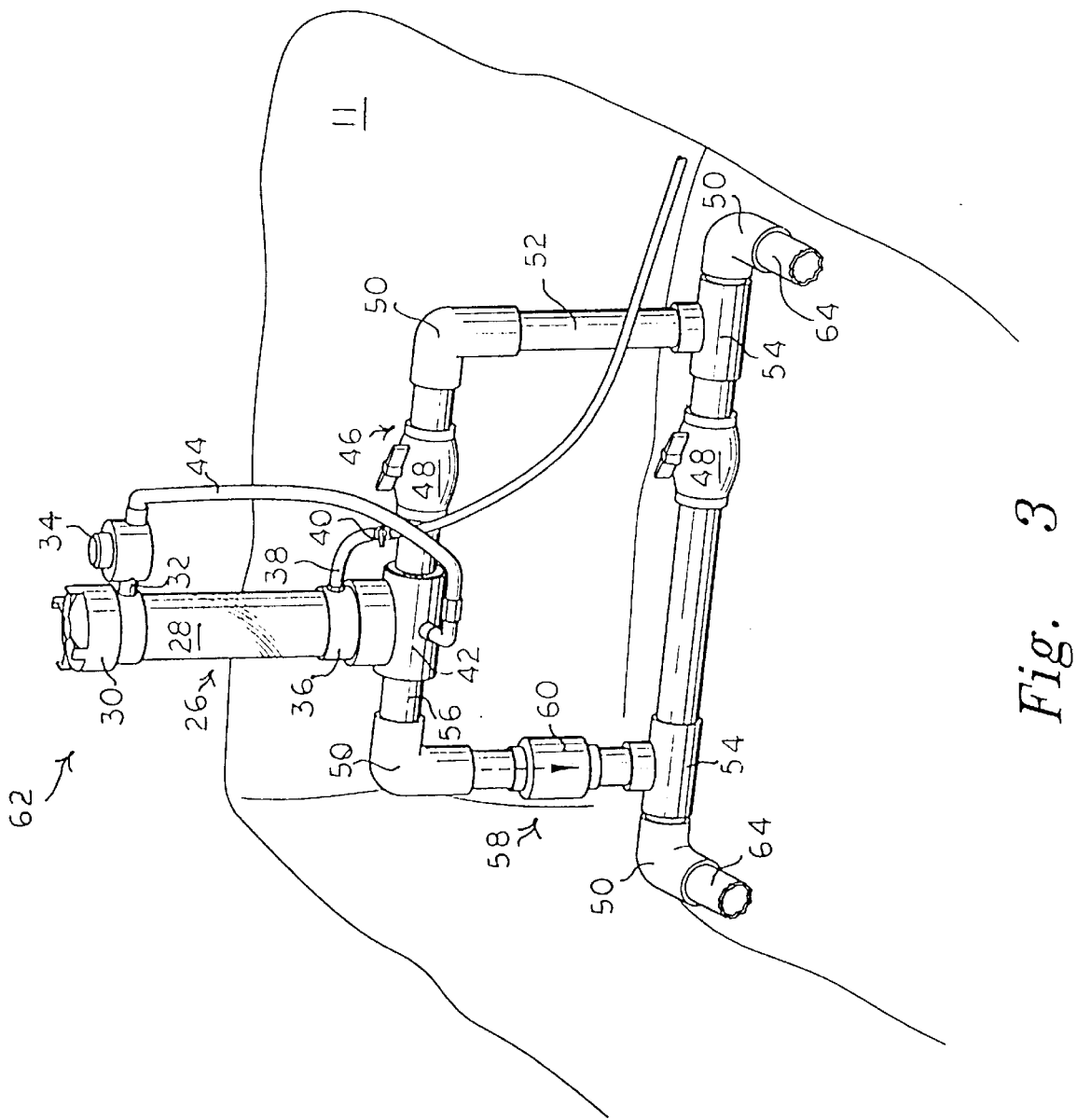
FIG. 3 is an environmental perspective view of a second embodiment of a fertilizer system with the mixing chamber placed above the ground.

Turning to FIG. 2, an above ground system 22 is depicted which is connected directly to a main water pipeline 24. In FIG. 3, an above ground system 62 is connected in parallel to the main water pipeline 24. Therefore, FIGS. 2 and 3 will be discussed together. A conventional chlorinator mixing chamber made by Rainbow Lifegard Products, Inc., El Monte, Calif. has been modified for use in the systems 22 and 62. A vertically oriented cylindrical mixing chamber 26 having a transparent or opaque tube 28 with a cap 30 on top is connected by an influent conduit 32 to an adjustable flow meter valve 34. The flow meter valve 34 has indicia (not shown) for increasing the water flow from zero to 5 in incremental units. The chamber 26 has an internal centered vertical standpipe (not shown) open on top and a check valve (not shown) at its bottom end originally supplied with the chlorinator unit. A sponge filter (hidden) has been added to the chamber 26 to prevent outflow of granular undissolved material.

An end cap 36 at the bottom of the tube 28 has a flexible effluent drain tube 38 with a shutoff valve 40 leading to the unpressurized sprinkler line to drain the mixing chamber 26 when the system 10 is not being used. A tee connection 42 mates with the end piece 36 and has an effluent or recycle tube 44 leading to the adjustable flow meter valve 34.

A pipe system for connecting the mixing chamber 26 to the main water pipeline 24 begins with a horizontal pipe 46 having an upper shutoff valve 48 connected to the right or inlet opening of the tee connection 42. This upper shutoff valve 48 is opened only when mixing is to occur.

The opposite end of the horizontal pipe 46 is connected by an elbow 50 to a first vertical inlet pipe 52 which is connected to the main water pipeline 24 at the lower end by a tee connection 54.

A second elbow 50 is connected by a horizontal nipple 56 to the left or outlet opening of the tee connection 42. A second vertical outlet pipe 58 which is parallel to the first vertical inlet pipe 52 and having a one-way flow valve 60 is connected by another tee connection 54 to the main water pipeline 24. A lower shutoff valve 48 is inserted in the main water pipeline 24 between the tee connections 54 for the purpose of diverting water towards the mixing chamber 26 with the upper shutoff valve 48 open and the shutoff valve 40 of the drain tube 38 closed. When the pressurized water flows through pipe 52 as indicated by the arrow, the water enters the tee connector 42 and is forced to enter the effluent tube 44 as shown by a directional arrow because the check valve inside the mixing chamber 26 prevents any flow into the mixing chamber. When the water pressure exceeds a certain value, the check valve will open to permit the flow of dissolved fertilizer solution from the mixing chamber 26 to flow through pipes 56, 58 and the one-way check valve 60 back to the main water pipeline 24 as shown by the directional arrow in FIG. 2.

FIG. 3 illustrates a second embodiment, wherein the above ground system 62 is connected by elbows 50 to auxiliary pipes 64 to the main water pipeline 24.

Figure 4:
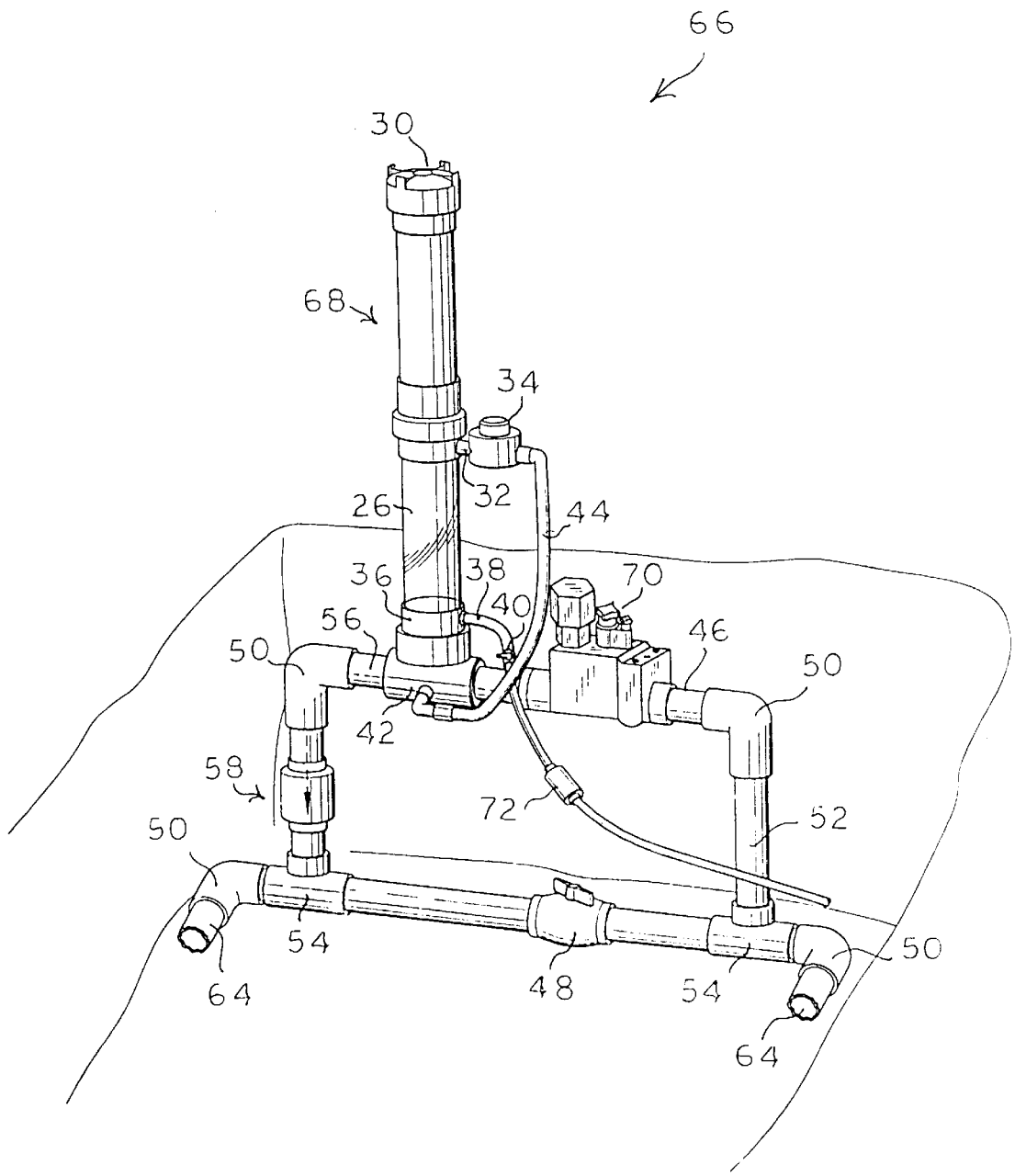
FIG. 4 is a third embodiment of a multiple mixing chamber and including a solenoid controlled water control valve substituted for the shutoff valve in the influent water line and a combination line drain valve and ball operated check valve.

FIG. 4 is a third embodiment apparatus 66 of a multiple mixing chamber 68 having a doubled volume with a solenoid operated remote control valve 70 (Rain Bird Sprinkler Manufacturing Corporation, Model 100-DVF-MB) in the influent water line and an innovative combination line drain valve (Rain Bird Model 16A-FDV-075) and ball operated check valve system 72 (hereafter referred to as the combined valve system) in the drain tube 38. It is noted that the electrical connection from the valve 70 to the existing sprinkler system controller and timer is not shown. The multiple mixing chamber 68 enhances the mixing capacity. The solenoid operated valve 70 enables the opening of the valve only when both of the parameters of the electrical impulse and pressurized water are present. The valve 70 receives its electrical power from the existing sprinkler and timer controller system. Consequently, the apparatus 66 can be operated remotely and automatically. Since the valve 70 can be controlled automatically, the shutoff valve 48 in the FIG. 2 embodiment can still be included upstream of the valve 70 in the FIG. 4 embodiment as an optional manual valve for closing during the off-season to relieve pressure from valve 70 and the mixing chamber 26. The remaining elements are identical to the apparatus depicted in FIG. 3.

Figure 5:
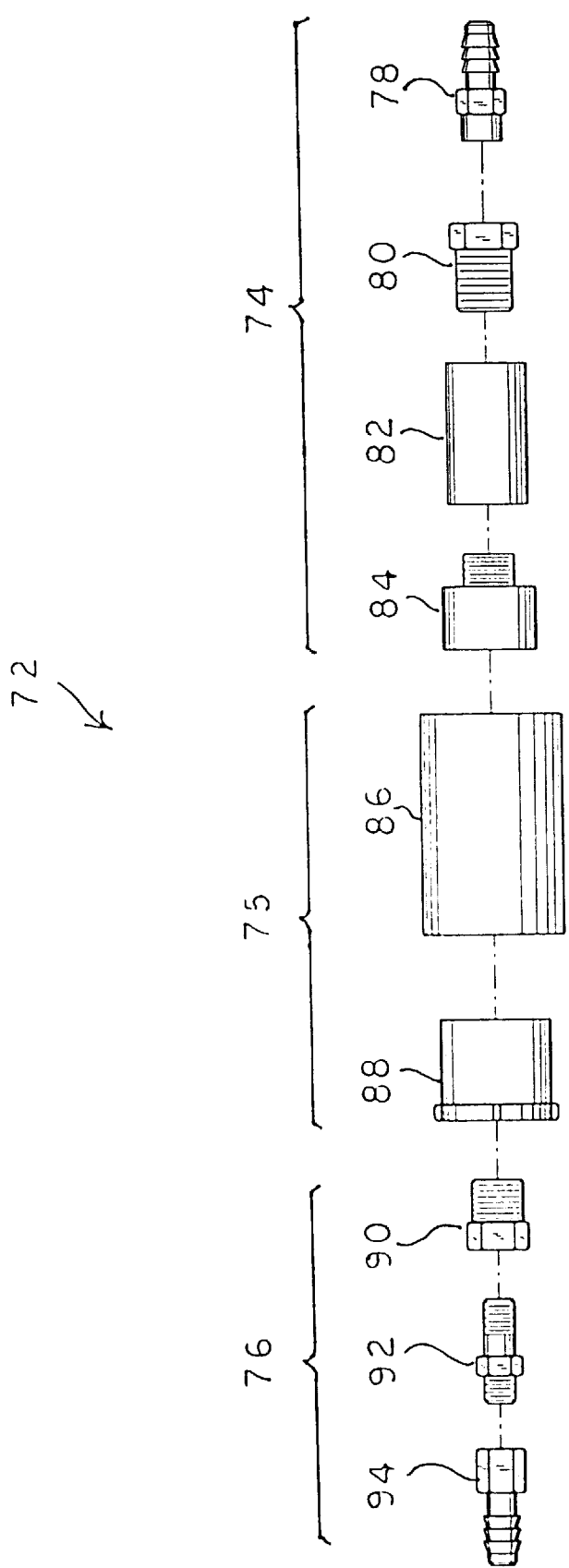
FIG. 5 is an exploded elevational side view of the parts of the combination line drain valve and ball operated check valve employed in the third embodiment.

FIG. 5 is an exploded elevational side view of the nine parts of the innovative combined valve system 72 utilized in the third embodiment apparatus 66. It is designed to be activated when the solenoid valve 70 closes. The valve system 72 comprises an upstream portion 74, an interface portion 75 and a downstream portion 76. The portion 72 comprises the line drain component 74 having an average opening pressure of 2.5 psi and an average closing pressure of 5.5 psi. The line drain component 74 begins to relieve the waterline pressure from the mixing chambers 26 or 68 immediately when the sprinkler system shuts down. As the water pressure decreases the dripping increases. When the inside pressure in the mixing chambers decreases to approximately 2.5 psi, the line drain component 74 completely opens to allow a steady flow of the entrained water and emptying the mixing chamber 68 in 25 to 30 minutes.

The ball operated check valve 92 is in the portion 76 of the combined valve system 72. The check valve 92 has a free floating ball (hidden) inside which acts as a check valve under water pressure. When there is no pressure on this valve, the check valve 92 allows the water in the line to flow by gravity through the combined valve system 72 into the unpressurized water line of the sprinkler zone it drains into. When the water pressure is increased as when the sprinkler system in this zone is operating, the ball operated check valve 92 closes to prevent water under pressure to feed back into the line drain component 74.

The specific parts of the combined valve system 72 in FIG. 5 will now be explained in detail. A male brass connector 78 connects to an exemplary ⅜ in. I.D. plastic water sprinkler supply line with hose clamps (not shown). A threaded brass fitting 80 with a ⅝ in. I.D. and ¾ in. threaded O.D. is coupled to a ¾ in. I.D. polyvinylchloride (PVC) pipe 82 which is internally threaded at both ends. A black plastic ¾ in. O.D. Rain Bird line drain valve (16A-FDV-075) 84 connects pipe 82 to the first portion of the interface portion 75 comprising a 1 in. I.D. PVC coupling 86 by friction fitting and permits dismantling at this joint between drain valve 84 and interface coupling 86 for replacement of worn or faulty line drain valves. Coupling 86 is friction fitted to a second element of the interface portion 75, i.e., a PVC bushing 88, which reduces to a threaded ¾ in. I.D. An externally threaded brass reducer fitting 90 with a ¾ in. O.D. end has an opposite end which is internally threaded with ½ in. I.D. for connection to a ball operated check valve 92 having both ends ½ in. O.D. and threaded. A female ½ in. I.D. brass connector portion of the valve 94 connects to an exemplary ⅜ in. plastic sprinkler line by hose clamps (not shown). The combination drain/check valves system 72 can be positioned vertically or inclined to allow and enhance gravity flow of the aqueous liquid from the mixing chamber.

The combined valve operation is important because it prevents free standing water from remaining in the mixing chamber. This action prevents the water soluble fertilizer tablets from dissolving when the system is not operating.

A chemical additive such as a fertilizer, fungicide or pesticide is added to the mixing chamber 26 for mixing and feeding the main water pipeline 24 at a controlled rate by the flowmeter valve 34. The additive can be in either liquid or 100% dissolvable granular form as large as 3 inch diameter tablets or pellets.

Thus, an economical retrofitting chemical additive dispensing system has been shown for adding fertilizer compounds to an existing underground or above ground water sprinkler system.

It is to be understood that the present invention is not limited to the sole embodiments described above, but encompasses any and all embodiments within the scope of the following claims.

We claim:

1. A chemical feeding system for adding chemicals to an aqueous distribution system comprising:
    a vertically oriented cylindrical mixing chamber having a transparent or opaque tube with a cap on top connected by an effluent conduit to an adjustable flow meter valve;
    an end cap for said transparent tube having a flexible effluent drain tube with a shutoff valve leading to a main water pipeline;
    a tee connection mating with the end cap and having an effluent tube leading to said adjustable flow meter valve;
    a pipe system for said mixing chamber comprising:
        a first vertical inlet pipe connected to the main water pipeline;
        a first elbow connected to said first vertical inlet pipe;
        a shutoff valve inserted in a horizontal pipe connected to said first elbow at one end and to the tee connection;
        a second horizontal pipe connected to an outlet portion of the tee connection and a second elbow connected to the second horizontal pipe;
        a second vertical outlet pipe; and
        a one-way flow valve connected to short pipes at both ends to connect to said second elbow and to said main water pipeline; and
        a shutoff valve inserted in the main water pipeline between the first and second vertical outlet pipes;
    whereby a chemical additive is added to the mixing chamber for mixing and feeding the main water pipeline at a controlled rate by the flow meter valve.

2. The system according to claim 1, including a cover for the chemical feeding system when placed below ground level with ascending pipes.

3. The system according to claim 1, further comprising a chemical additive selected from the group consisting of a fertilizer, insecticide and a herbicide in granular or liquid form.

4. The system according to claim 1, further comprising a second cylindrical mixing chamber aligned atop said vertically oriented cylindrical mixing chamber to at least double the volume of the vertically oriented cylindrical mixing chamber.

5. The system according to claim 1, further comprising the addition of a solenoid containing flow valve in an influent line and a combination line drain and a ball operated check valve in the drain tube, whereby automatic operation of the chemical feeding system and draining thereof are enabled.

* * * * *